US012306835B1

(12) United States Patent
Gale et al.

(10) Patent No.: US 12,306,835 B1
(45) Date of Patent: *May 20, 2025

(54) DASHBOARD LOADING FROM A CLOUD-BASED DATA WAREHOUSE CACHE

(71) Applicant: SIGMA COMPUTING, INC., San Francisco, CA (US)

(72) Inventors: James L. Gale, San Francisco, CA (US); Kenneth Truong, Temple City, CA (US); Max H. Seiden, San Francisco, CA (US); Stipo Josipovic, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,049

(22) Filed: Aug. 24, 2023

Related U.S. Application Data

(63) Continuation of application No. 18/079,412, filed on Dec. 12, 2022, now Pat. No. 11,868,351, which is a continuation of application No. 16/927,397, filed on Jul. 13, 2020, now Pat. No. 11,593,375.

(60) Provisional application No. 62/961,369, filed on Jan. 15, 2020.

(51) Int. Cl.
| | |
|---|---|
| *G06F 17/00* | (2019.01) |
| *G06F 16/2455* | (2019.01) |
| *G06F 16/248* | (2019.01) |
| *G06F 16/25* | (2019.01) |

(52) U.S. Cl.
CPC ...... *G06F 16/24552* (2019.01); *G06F 16/248* (2019.01); *G06F 16/254* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | |
|---|---|---|
| 5,745,737 A | 4/1998 | Kayes et al. |
| 6,182,133 B1 | 1/2001 | Horvitz |
| 9,495,473 B2 | 11/2016 | Gardner et al. |
| 10,776,355 B1 | 9/2020 | Batsakis et al. |
| 11,308,106 B1 * | 4/2022 | Muralimanohar ...... G06F 16/27 |
| 11,704,327 B2 * | 7/2023 | Neugebauer ...... G06F 16/24552 707/696 |

(Continued)

FOREIGN PATENT DOCUMENTS

| | | |
|---|---|---|
| CN | 106126604 A | 11/2016 |
| CN | 107924406 A | 4/2018 |

(Continued)

OTHER PUBLICATIONS

International Search Report and Written Opinion, PCT/US2020/062081, Feb. 26, 2021, 11 pages.

(Continued)

*Primary Examiner* — Hung D Le

(57) ABSTRACT

Dashboard loading from a cloud-based data warehouse cache, including determining that a result for a first query is stored in a cache of a cloud-based data warehouse; sending, in response to the result being stored in the cache, to the cloud-based data warehouse, a request for the result from the cache; and providing, based on the result for the first query, one or more dashboard visualizations.

20 Claims, 11 Drawing Sheets

(56) References Cited

U.S. PATENT DOCUMENTS

| | | | |
|---|---|---|---|
| 2004/0168115 A1 | 8/2004 | Bauernschmidt et al. | |
| 2007/0088681 A1 | 4/2007 | Aravamudan et al. | |
| 2008/0059441 A1* | 3/2008 | Gaug | G06Q 10/10 |
| 2009/0307257 A1* | 12/2009 | Menon | G06F 16/2465 |
| | | | 707/999.102 |
| 2009/0319476 A1* | 12/2009 | Olston | G06F 16/24539 |
| 2011/0302168 A1* | 12/2011 | Aggarwal | G06F 16/316 |
| | | | 707/E17.046 |
| 2012/0017165 A1* | 1/2012 | Gardner | H04L 41/22 |
| | | | 715/771 |
| 2013/0297588 A1* | 11/2013 | Tyagi | G06Q 10/10 |
| | | | 707/E17.014 |
| 2014/0111545 A1 | 4/2014 | Damola | |
| 2015/0088805 A1 | 3/2015 | Kakarla et al. | |
| 2015/0254294 A1* | 9/2015 | Marais | G06F 16/275 |
| | | | 707/690 |
| 2015/0296040 A1* | 10/2015 | Wang | G06F 16/9574 |
| | | | 709/213 |
| 2016/0034553 A1* | 2/2016 | Tong | G06F 16/248 |
| | | | 707/754 |
| 2016/0125029 A1* | 5/2016 | Damm | G06F 16/9535 |
| | | | 707/722 |
| 2017/0017614 A1 | 1/2017 | Simonyi et al. | |
| 2017/0017688 A1* | 1/2017 | Das | H04L 67/10 |
| 2017/0139816 A1 | 5/2017 | Sapozhnikov et al. | |
| 2018/0124095 A1 | 5/2018 | Hamdi | |
| 2019/0306010 A1* | 10/2019 | Medam | H04L 41/069 |
| 2019/0377682 A1* | 12/2019 | Roh | G06F 12/0893 |
| 2020/0099745 A1* | 3/2020 | Diaconu | G06F 11/2097 |
| 2020/0142787 A1* | 5/2020 | Thatikonda | G06F 3/0647 |
| 2020/0208857 A1* | 7/2020 | Nayak | G05B 23/0216 |
| 2020/0334257 A1* | 10/2020 | Nicolaisen | G06F 16/9574 |
| 2020/0334317 A1* | 10/2020 | Ashman | G06F 16/957 |
| 2021/0081252 A1* | 3/2021 | Bhargava | G06F 9/5072 |
| 2021/0110897 A1* | 4/2021 | Ginsburg | G16H 10/60 |
| 2021/0216552 A1 | 7/2021 | Gale et al. | |
| 2021/0216553 A1 | 7/2021 | Gale et al. | |
| 2023/0177210 A1* | 6/2023 | Avanes | G06F 9/541 |

FOREIGN PATENT DOCUMENTS

| | | |
|---|---|---|
| CN | 110347707 A | 10/2019 |
| CN | 110347706 A | 2/2022 |
| WO | 2019082177 A1 | 5/2019 |

OTHER PUBLICATIONS

International Search Report and Written Opinion, PCT/US2020/067209, Mar. 21, 2021, 11 pages.

Lawrence et al., "Next Generation JDBC Database Drivers for Performance, Transparent Caching, Load Balancing, and Scale-out", Proceedings of the Symposium on Applied Computing, Apr. 2017, 4 pages, DOI: 10.1145/3019612.3019870, ACM New York.

Wikipedia, "Dashboard (business)", URL: https://en.wikipedia.org/wiki/Dashboard_(business), last edited on Dec. 26, 2020, printed Feb. 24, 2021, 6 pages.

Chinese Patent Office, Application No. 202080098429.2, Office Action dated Jun. 29, 2004, 10 pages.

\* cited by examiner

DASHBOARD LOADING FROM A CLOUD-BASED DATA WAREHOUSE CACHE

BACKGROUND

Field of the Invention

The field of the invention is data processing, or, more specifically, methods, apparatus, and products for dashboard loading from a cloud-based data warehouse cache.

Description of Related Art

Modern businesses may store large amounts of data in remote databases within cloud-based data warehouses. This data may be accessed using database query languages, such as structured query language (SQL). However, some query responses may include too much data to present efficiently in a web application.

SUMMARY

Methods, systems, and products for dashboard loading from a cloud-based data warehouse cache are disclosed in this specification. Dashboard loading from a cloud-based data warehouse cache may include: determining that a result for a first query is stored in a cache of a cloud-based data warehouse; sending, in response to the result being stored in the cache, to the cloud-based data warehouse, a request for the result from the cache; and providing, based on the result for the first query, one or more dashboard visualizations.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
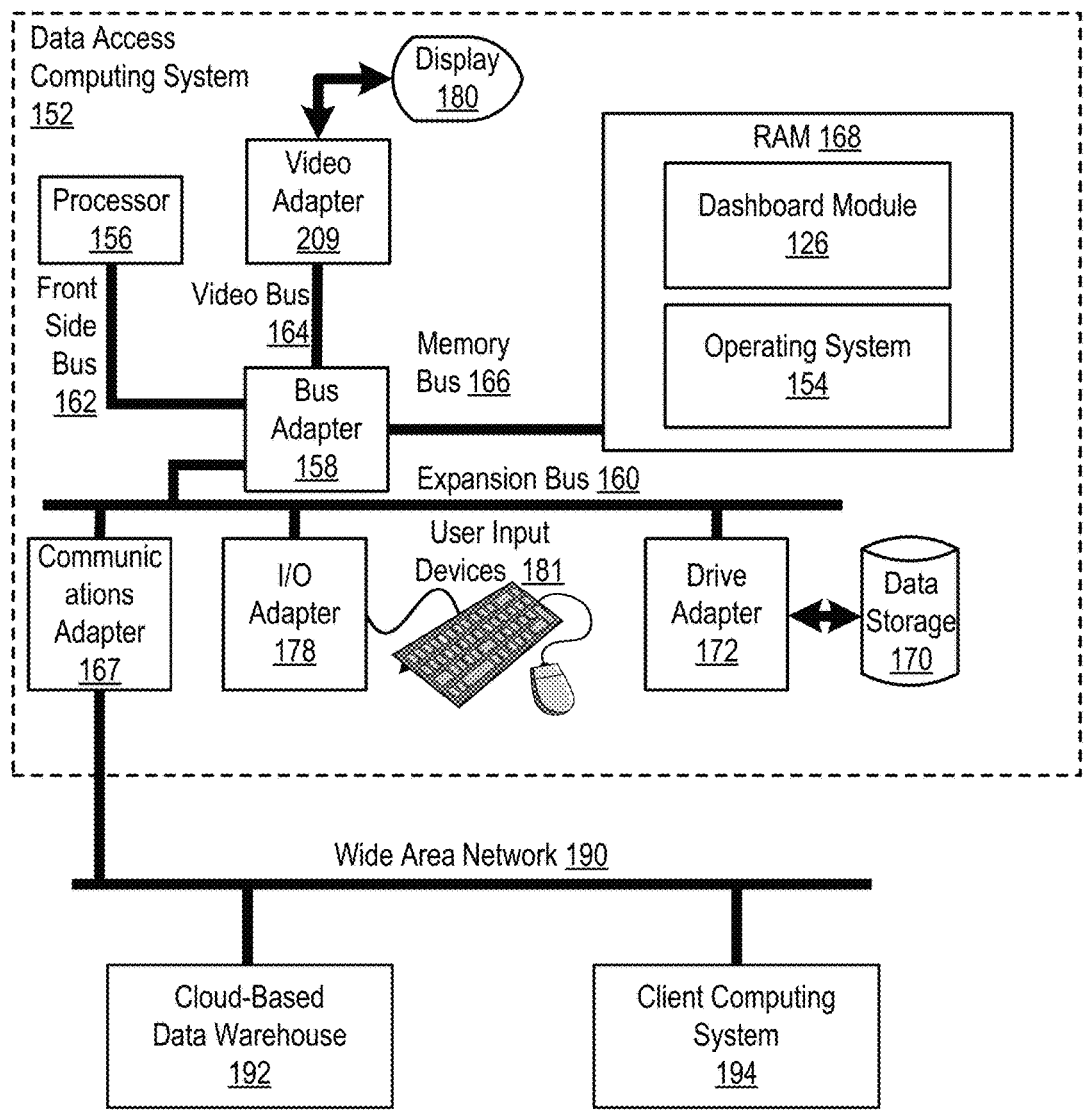
FIG. 1 sets forth a block diagram of an example system configured for dashboard loading from a cloud-based data warehouse cache according to embodiments of the present invention.

Exemplary methods, apparatus, and products for dashboard loading from a cloud-based data warehouse cache in accordance with the present invention are described with reference to the accompanying drawings, beginning with FIG. 1. FIG. 1 sets forth a block diagram of automated computing machinery comprising an exemplary data access computing system (152) configured for dashboard loading from a cloud-based data warehouse cache according to embodiments of the present invention. The data access computing system (152) of FIG. 1 includes at least one computer processor (156) or 'CPU' as well as random access memory (168) ('RAM') which is connected through a high speed memory bus (166) and bus adapter (158) to processor (156) and to other components of the data access computing system (152).

Stored in RAM (168) is an operating system (154). Operating systems useful in computers configured for dashboard loading from a cloud-based data warehouse cache according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the dashboard module (126), a module for dashboard loading from a cloud-based data warehouse cache according to embodiments of the present invention.

The data access computing system (152) of FIG. 1 includes disk drive adapter (172) coupled through expansion bus (160) and bus adapter (158) to processor (156) and other components of the data access computing system (152). Disk drive adapter (172) connects non-volatile data storage to the data access computing system (152) in the form of data storage (170). Disk drive adapters useful in computers configured for dashboard loading from a cloud-based data warehouse cache according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example data access computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example data access computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary data access computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for dashboard loading from a cloud-based data warehouse cache according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client computing system (194). The cloud-based data warehouse (192) is a computing system or group of computing systems that hosts a database for access over the wide area network (190). The client computing system (194) is a computing system that accesses the database via the data access computing system (152).

Figure 2:
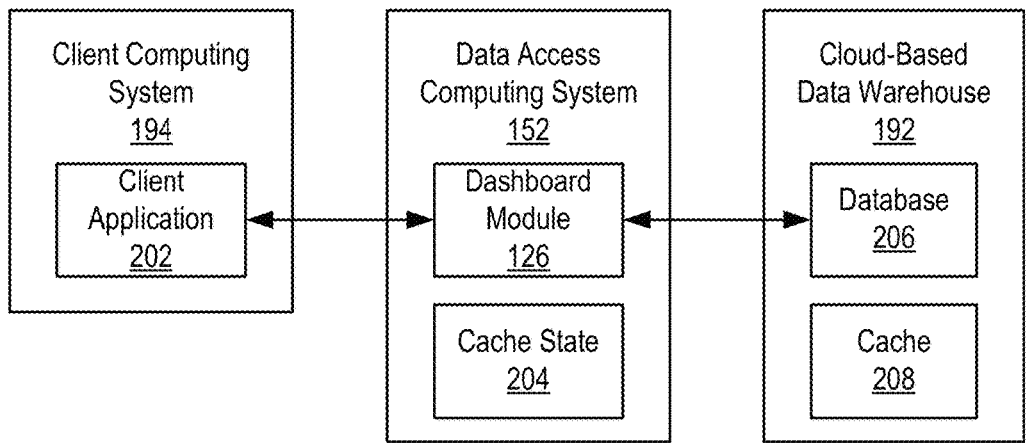
FIG. 2 sets forth a block diagram of an example system configured for dashboard loading from a cloud-based data warehouse cache according to embodiments of the present invention.

FIG. 2 shows an exemplary block diagram of a system for dashboard loading from a cloud-based data warehouse cache according to embodiments of the present invention. As shown in FIG. 2, the system includes a data access computing system (152), a cloud-based data warehouse (192) and a client computing system (196). The data access computing system (152) includes a dashboard module (126) and a cache state (204) data structure. The cloud-based data warehouse (192) includes a database (206) and a cache (208). The client computing system (196) includes a client application (202). The client application (202) may include a web browser, dedicated software application, mobile application, or other application to access the data access computing system (152) using the client computing system (194).

The database (206) is a collection of data stored in the cloud-based data warehouses (192) and management systems for the data. The management systems may receive database queries, such as structure query language (SQL) queries, and respond to queries with a data set. The cache (208) is a portion of memory that stores data for fast retrieval. For example, the cache (208) may store data sets generated in response to a query to the database (206).

The dashboard module (126) is configured to provide a user accessing the data access computing system (152) (e.g., via the client application (202)) with a dashboard user interface. The dashboard may include one or more visualizations of data stored in the database (206), such as graphs, charts, tables, etc. Accordingly, to generate a dashboard for a given user, the dashboard module (126) may execute one or more predefined queries for submission to the database (206) and generate the visualizations based on a result of the one or more queries. A given dashboard may be associated with particular user accounts (e.g., each user is associated with a corresponding dashboard), particular roles or user groups (e.g., each user in the role or group is associated with a same dashboard), etc. Thus, when a client application (202) associated with a particular user accesses the data access computing system (152), the dashboard module (126) may submit the one or more queries to the database (206) required to generate the dashboard visualizations.

As the queries used to generate a given dashboard may remain unchanged for extended periods of time, and as multiple users may access the same dashboard (e.g., due to belonging to the same role, company, group, etc.), the dashboard module (126) may repeatedly require data based on the same queries to generate the same dashboard. If each loading of a dashboard required the same queries to be submitted to the database (206), both the data access computing system (152) and the cloud-based data warehouse (192) would experience a significant computational and network traffic burden. Moreover, the results of these queries may remain unchanged for some period of time, requiring computational resources to be used to generate duplicate results.

To address these shortcomings, the dashboard module (126) determines whether a result for a query (e.g., a query used to generate a dashboard) is stored in the cache (208) of the cloud-based data warehouse (192). For example, the user has recently accessed a given dashboard, or another user has recently accessed the same given dashboard, the results of a query used to generate a dashboard visualization may still be stored in the cache (208). To determine if the result of a query is stored in the cache (208), the dashboard module (126) maintains a cache state (204) data structure. The cache state (204) data structure may be embodied as a database or other data structure as can be appreciated. The cache state (204) data structure may indicate which queries have results stored in the cache (208). The cache state (204) data structure may also include a timestamp indicating when the results for the query were generated. Each entry in the cache state (204) data structure may be indexed by a digest of a query. The digest may include an MD5 hash or other hash of the query. The digest may also be based on a normalized form of the query. In other words, generating a digest for a query may include normalizing the query and applying a digest function to the normalized query.

Determining whether a result for a query is stored in the cache (208) may include determining if an entry for the query is stored in the cache state (204). For example, determining whether a result for the query is stored in the cache (208) may include generating a digest for the query and determining if an entry corresponding to the digest is stored in the cache state (204). Where an entry is stored in the cache state (204), the dashboard module (126) may send a request for the result from the cache (208).

The dashboard module (126) may determine a location in the cache (208) for the result and then request, from the could-based data warehouse (192), the results stored in the determined location. For example, the entry in the cache state (204) may indicate a location in the cache (208) for the results. As another example, the entry in the cache state (204) may include a query identifier. The query identifier may include a unique identifier generated when the query was submitted to the database (206) and the result for the query generated by the cloud-based data warehouse (192). Another data structure associating query identifiers with locations in the cache (208) may then be queried to determine a location in the cache (208) for the result. A request indicating the location in the cache (208) may then be submitted to the cloud-based data warehouse (192). As a further example, where the cache state (204) entry includes a query identifier, the query identifier may be included in a request to the cloud-based data warehouse (192). The cloud-based data warehouse (192) may maintain a data structure associating query identifiers with locations in the cache. The cloud-based data warehouse (192) may then load the result from the cache (208) based on the data structure and the query identifier from the request. The cloud-based data warehouse (192) may then send the result to the data access computing system (152).

After receiving a result from the cache (208) of the cloud-based data warehouse, the dashboard module (126) may provide, based on the result, one or more dashboard visualizations. As the dashboard visualizations are provided based on cached data, the dashboard is generated faster, providing for an improved user experience. Moreover, the cloud-based data warehouse (192) experiences a reduced computational burden by not having to process queries for each loading of a dashboard.

The results of queries stored in the cache (208) are associated with an age. The age of a result is the amount of time since the result was generated or first received by the data access computing system (152) (e.g., in response to submitting a query to the database (206)). The dashboard module (126) may determine that an age associated with the result exceeds a threshold (e.g., one hour). For example, an entry in the cache state (204) may indicate a time at which the result was generated or first received. Where the age exceeds the threshold, the dashboard module (126) may submit the query to the database (206) for results to the query. The dashboard module (126) may submit the query concurrent to or after requesting the result from the cache (208). After receiving results to the query from the database (206), the dashboard module (126) may update or refresh the one or more dashboard visualizations based on the updated results. Thus, the one or more dashboard visualizations are initially provided based on the cached results, and then updated based on the newly generated results. The dashboard module (126) may update an entry in the cache state (204) corresponding to the query to reflect the age of the updated results.

The dashboard module (126) may also compare the age of the result to another threshold (e.g., 24 hours). Where the age of the cached result exceeds the other threshold, the dashboard module (126) may send the query to the database (206) for the results instead of requesting the results from the cache (208). Thus, when cached results are older than a certain age, the results are regenerated instead of accessed from the cache. The threshold to determine whether or not to request the results from the cache (208) may be used instead of or in combination with a threshold to determine whether to submit the query to the database (206) in addition to loading the results from the cache (208). For example, where the results in the cache (208) are less than an hour old, the results may be only loaded from the cache (208) for use in the dashboard visualizations. Where the results in the cache (208) are older than an hour but less than 24 hour old, the results may be loaded from the cache (208) for initial use in the dashboard visualizations, but the queries are also submitted to the database (206) for updating the dashboard visualizations. Where the results in the cache (208) are older than 24 hours, the query is submitted to the database (206) and the cached results are not used in presenting the dashboard visualizations.

Figure 3:
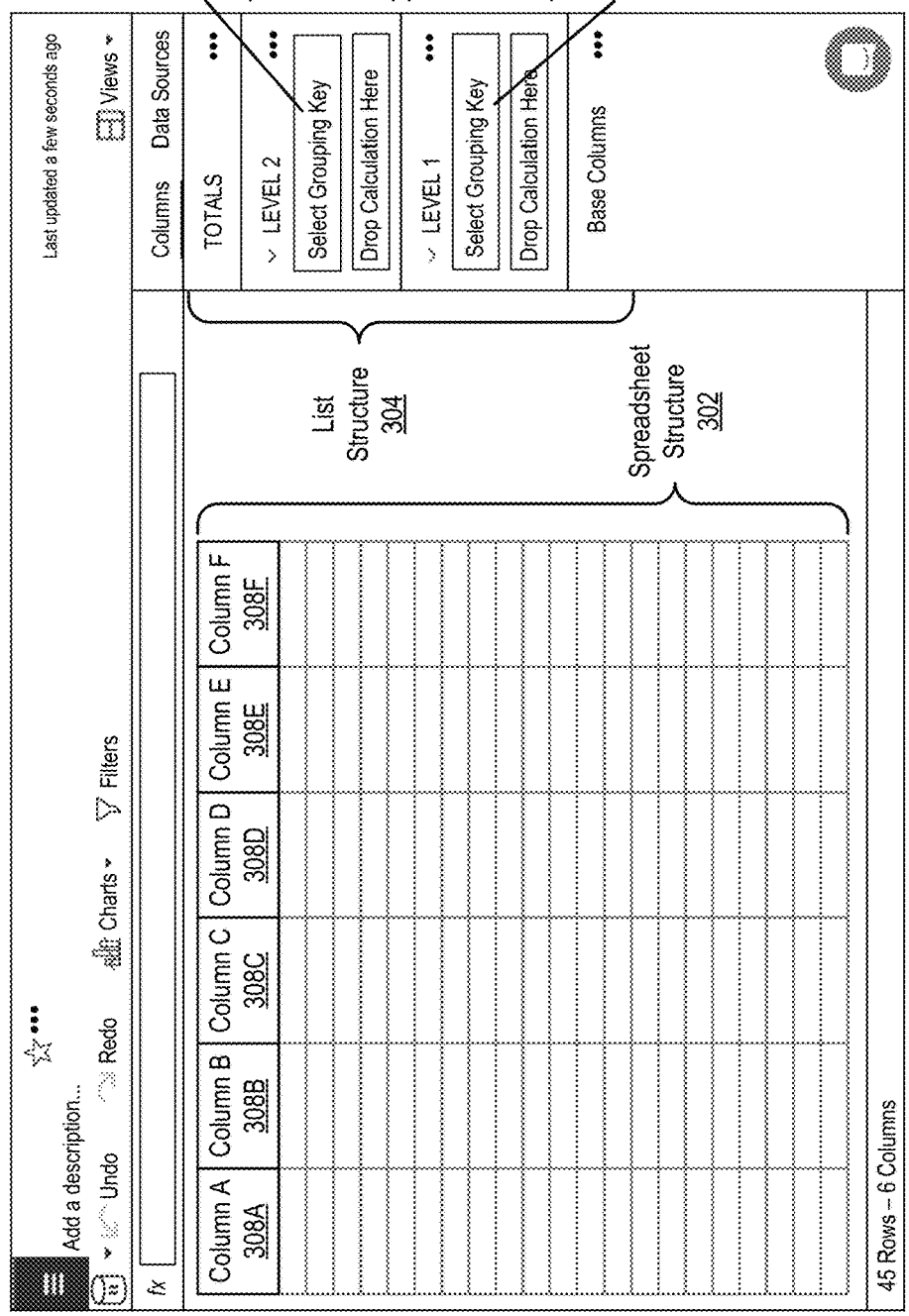
FIG. 3 sets forth a diagram of an example graphical user interface configured for dashboard loading from a cloud-based data warehouse cache according to embodiments of the present invention.

FIG. 3 shows an exemplary user interface for dashboard loading from a cloud-based data warehouse cache according to embodiments of the present invention. Shown is a graphical user interface (GUI) (302). The GUI (302) is a user interface that presents a data set and graphical elements to a user and receives user input from the user. The GUI (302) may be presented, in part, by the dashboard module (126) and displayed on a client computing system (194) (e.g., on a system display or mobile touchscreen). The GUI (302) may be encoded by an Internet application hosted on the data access computing system (152) for rendering by the client application (202) of the client computing system (194).

The GUI (302) presents, in part, worksheets to a user. A worksheet is a presentation of a data set from a database (306). A referencing worksheet is a worksheet that is linked from another worksheet (referred to as a data source worksheet). The referencing worksheet inherits the data set presented in the data source worksheet (i.e., data not excluded from presentation). The referencing worksheet may also inherit the results of formula applied to other data but not the formulas themselves. The referencing worksheet may be limited to the data set presented or otherwise made available in the data source worksheet (unless the user generating the referencing worksheet has access to excluded data in the database). A referencing worksheet may be linked from any number of data sources, including multiple data source worksheets.

The exemplary GUI (302) includes a spreadsheet structure (304) and a list structure (306). The spreadsheet structure (304) includes a data set (shown as empty rows) with six columns (column A (308A), column B (308B), column C (308C), column D (308D), column E (308E), column F (308F)).

The spreadsheet structure (304) is a graphical element and organizing mechanism for the data set. The spreadsheet structure (304) displays the data within the data set as rows of data organized by columns (column A (308A), column B (308B), column C (308C), column D (308D), column E (308E), column F (308F)). The columns delineate different categories of the data in each row of the data set. The columns may also be calculations using other columns in the data set.

The list structure (306) is a graphical element used to define and organize the hierarchical relationships between the columns (column A (308A), column B (308B), column C (308C), column D (308D), column E (308E), column F (308F)) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (306) presents a dimensional hierarchy to the user. Specifically, the list structure (306) presents levels arranged hierarchically across at least one dimension. Each level within the list structure (306) is a position within a hierarchical relationship between columns (column A (308A), column B (308B), column C (308C), column D (308D), column E (308E), column F (308F)). The keys within the list structure (306) identify the one or more columns that are the participants in the hierarchical relationship. Each level may have more than one key.

One of the levels in the list structure (306) may be a base level. Columns selected for the base level provide data at the finest granularity. One of the levels in the list structure (306) may be a totals or root level. Columns selected for the totals level provide data at the highest granular level. For example, the totals level may include a field that calculates the sum of each row within a single column of the entire data set (i.e., not partitioned by any other column).

The GUI (302) may enable a user to drag and drop columns (column A (308A), column B (308B), column C (308C), column D (308D), column E (308E), column F (308F)) into the list structure (306). The order of the list structure (306) may specify the hierarchy of the columns relative to one another. A user may be able to drag and drop the columns in the list structure (306) at any time to redefine the hierarchical relationship between columns. The hierarchical relationship defined using the columns selected as keys in the list structure (306) may be utilized in charts such that drilling down (e.g., double click on a bar), enables a new chart to be generated based on a level lower in the hierarchy.

Figure 4:
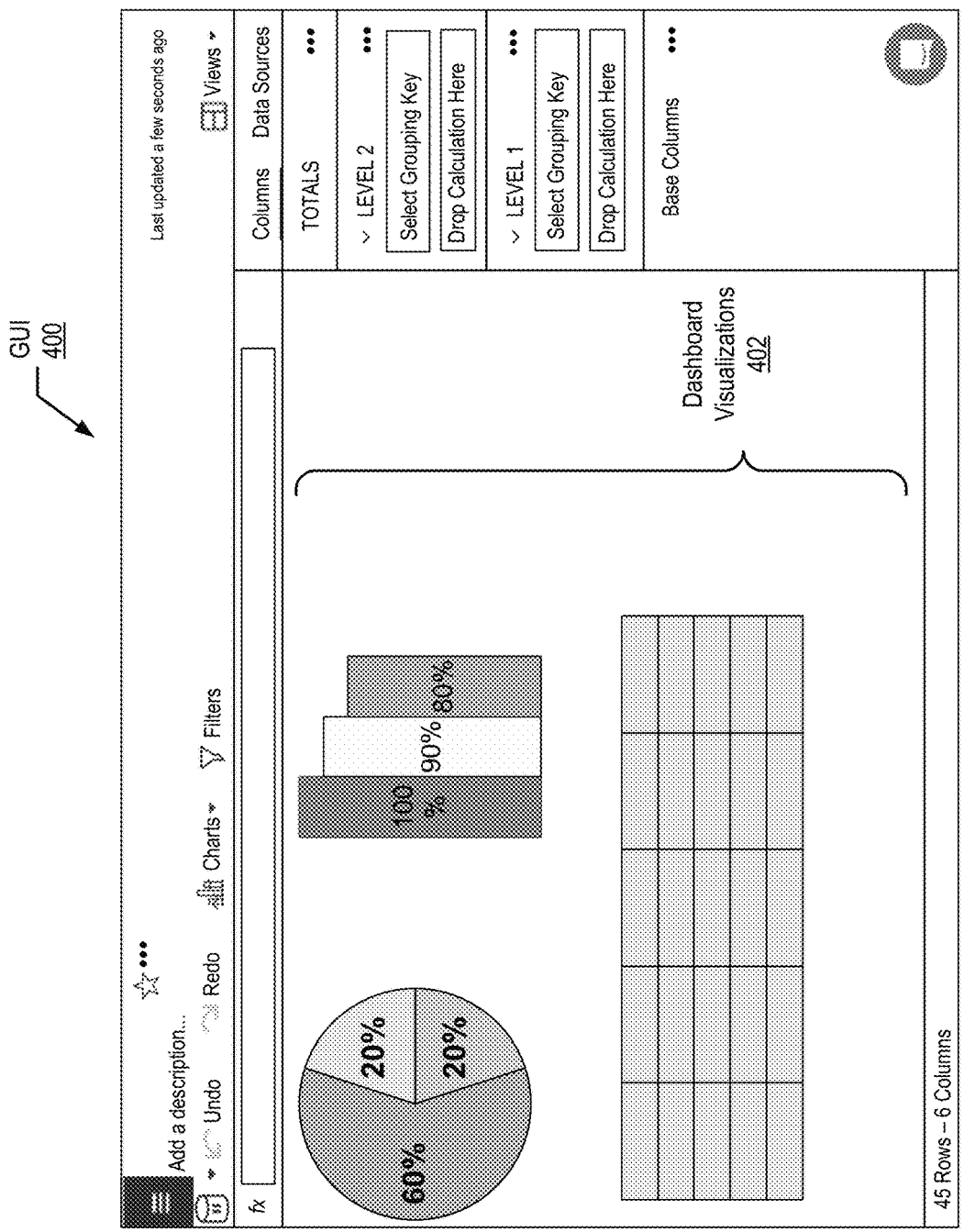
FIG. 4 sets forth a diagram of an example graphical user interface configured for dashboard loading from a cloud-based data warehouse cache according to embodiments of the present invention.

FIG. 4 shows an exemplary user interface for dashboard loading from a cloud-based data warehouse cache according to embodiments of the present invention. Shown is a graphical user interface (GUI) (400). The GUI (400) may be presented, in part, by the dashboard module (126) and displayed on a client computing system (194) (e.g., on a system display or mobile touchscreen). The GUI (400) may be encoded by an Internet application hosted on the data access computing system (152) for rendering by the client application (202) of the client computing system (194).

The GUI (400) includes a plurality of dashboard visualizations (402). Each of the dashboard visualizations (402) are visual representations of results of queries submitted to the database (206) by the dashboard module (126). The dashboard visualizations (402) may be based on results to queries submitted to the database (206) in response to loading the GUI (400). The dashboard visualizations (402) may also be based on cached results to queries submitted to the database (206) in response to a loading another instance of the GUI (400) (e.g., loaded by another user or entity).

Figure 5:
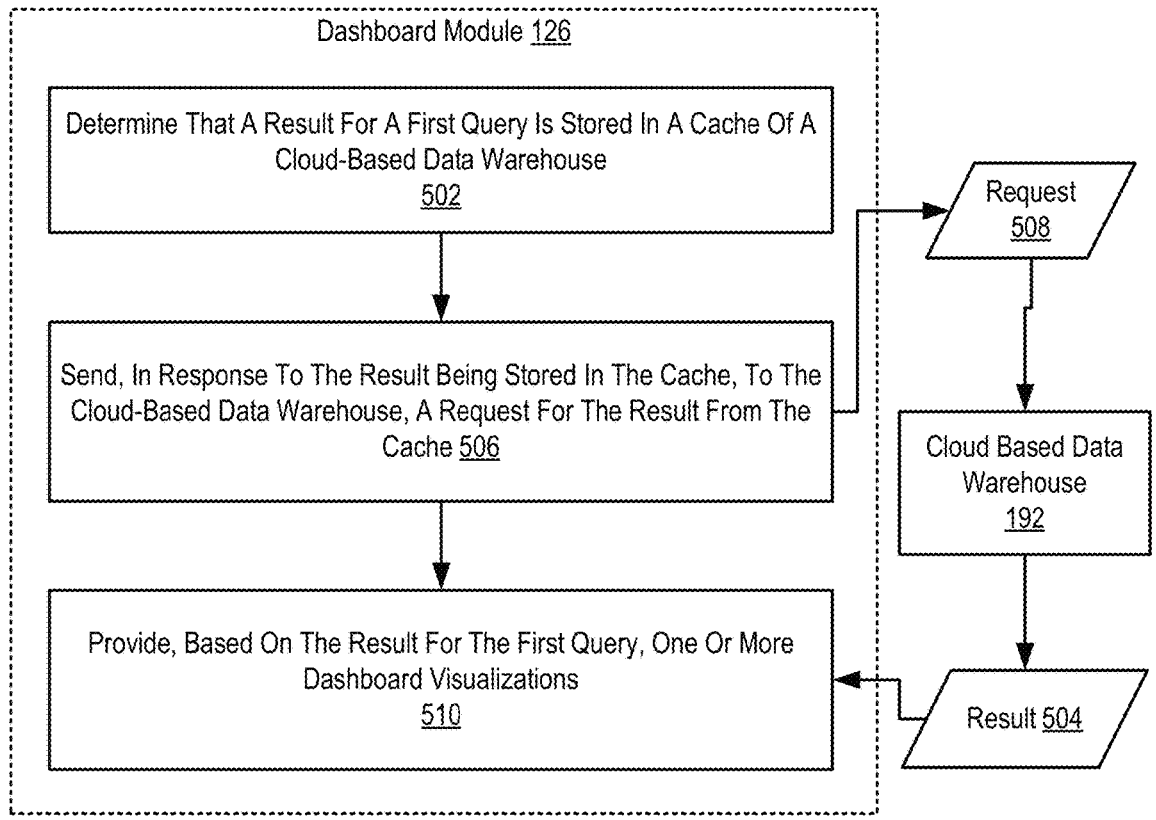
FIG. 5 sets forth a flow chart illustrating an exemplary method for dashboard loading from a cloud-based data warehouse cache according to embodiments of the present invention.

For further explanation, FIG. 5 sets forth a flow chart illustrating an exemplary method for dashboard loading from a cloud-based data warehouse cache according to embodiments of the present invention that includes determining (502) (e.g., by a dashboard module (126)) that a result for a first query is stored in a cache (208) of a cloud-based data warehouse (192). Determining (502) that a result (504) of a first query is stored in the cache (208) of the cloud-based data warehouse (192) may include accessing a data structure (e.g., a cache state (204)) indicating one or more queries with results stored in the cache (208). For example, each entry in the data structure may indicate a time at which a corresponding result was generated or received by the dashboard module (126). Each entry may include a query identifier generated when the corresponding query was submitted to a database (206) to generate the results. Each entry may be indexed by a digest or other identifier for a corresponding query. Determining (502) that the result (504) of the first query is stored in the cache (208) of the cloud-based data warehouse (192) may include determining that an entry corresponding to the first query is stored in the data structure.

The method of FIG. 5 also includes sending (506) (e.g., by the dashboard module (126)), in response to the result being stored in the cache (208), to the cloud-based data warehouse (192), a request (508) for the result from the cache (208). Sending (506) the request (508) may include calling an Application Program Interface (API) exposed by the cloud-based data warehouse (192) facilitating access to cached results. Thus, an API call or function may be used to access cached data that is different from an API call or function used to submit queries to a database (206) in the cloud-based data warehouse (192). The request (508) may indicate a particular location (e.g., address) in the cache (208) for retrieving the result (504). The request (508) may also indicate a query identifier for the first query. For example, entries of a data structure maintained by the dashboard module (126) indicating results that are stored in the cache (208) may include a query identifier. The query identifier may be accessed from the data structure and sent to the cloud-based data warehouse (192), which may maintain a data structure associating query identifiers and locations in cache (208) for corresponding results. Thus, the cloud-based data warehouse (192) can access, from the cache (208), the results for inclusion in a response to the request (508).

The method of FIG. 5 also includes providing (510) (e.g., by the dashboard module (126)), based on the result (504) for the first query, one or more dashboard visualizations. The one or more dashboard visualizations may include graphs, tables, charts, etc. As the one or more dashboard visualizations are based on cached data, the one or more dashboards may be generated and/or rendered faster than if the cloud-based data warehouse (192) had to fully process the first query.

Figure 6:
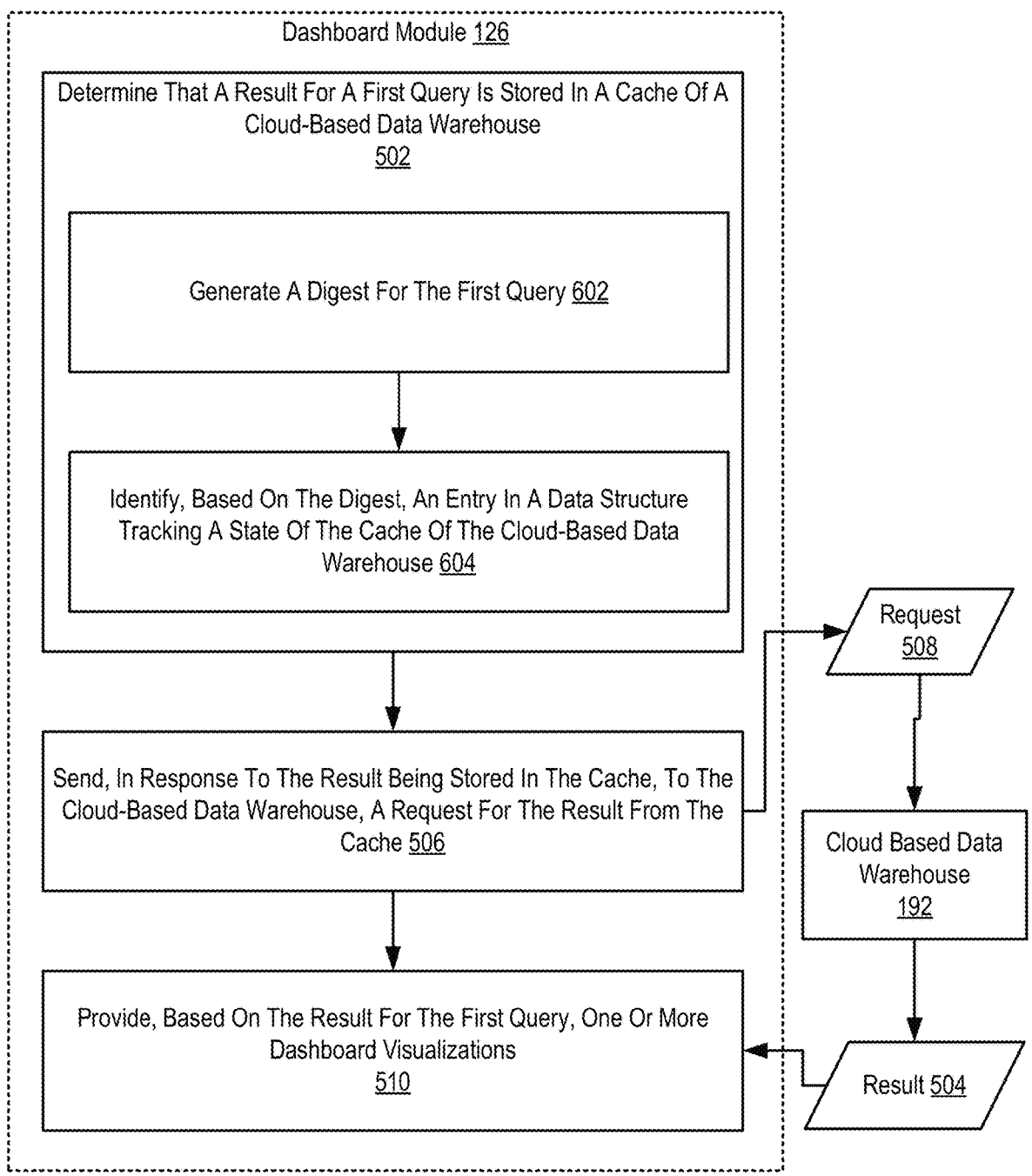
FIG. 6 sets forth a flow chart illustrating an exemplary method for dashboard loading from a cloud-based data warehouse cache according to embodiments of the present invention.

For further explanation, FIG. 6 sets forth a flow chart illustrating an exemplary method for dashboard loading from a cloud-based data warehouse cache according to embodiments of the present invention that includes determining (502) (e.g., by a dashboard module (126)) that a result for a first query is stored in a cache (208) of a cloud-based data warehouse (192); sending (506) (e.g., by the dashboard module (126)), in response to the result being stored in the cache (208), to the cloud-based data warehouse (192), a request (508) for the result from the cache (208); and providing (510) (e.g., by the dashboard module (126)), based on the result (504) for the first query, one or more dashboard visualizations.

The method of FIG. 6 differs from FIG. 5 in that determining (502) that a result for a first query is stored in a cache (208) of a cloud-based data warehouse (192) includes generating (602) (e.g., by the dashboard module (126)) a digest for the first query. Generating (602) a digest for the first query may include applying an MD5 function, hash function, or other function to the first query to generate the digest. Generating (602) the digest for the first query may also include normalizing the first query and applying a function to the normalized first query.

Determining (502) that a result for a first query is stored in a cache (208) of a cloud-based data warehouse (192) also includes identifying (604), based on the digest, an entry in a data structure tracking a state of the cache (208) of the cloud-based data warehouse (192). The data structure may include a cache state (204) data structure. The data structure may be encoded as a database, a table, or other data structure as can be appreciated. Each entry in the data structure may be indexed by a digest. Each entry in the data structure may include a timestamp indicating when results for the corresponding query were generated or received. Each entry in the data structure may also include a query identifier generated when the query was submitted to a database (206). Thus, identifying (604) an entry in the data structure corresponding to a digest of the first query indicates that results for the first query are stored in the cache (208) of the cloud-based data warehouse (192).

Figure 7:
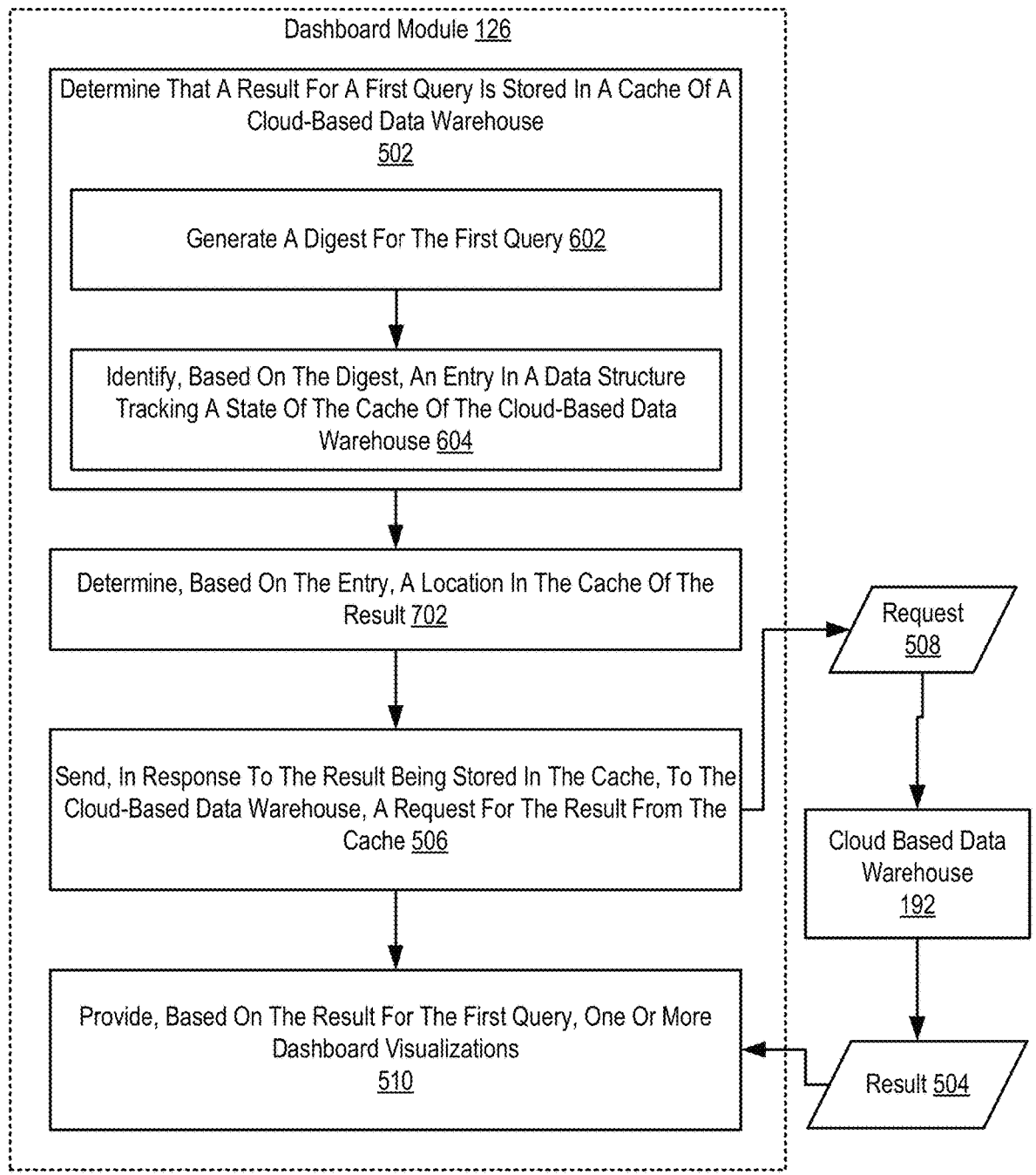
FIG. 7 sets forth a flow chart illustrating an exemplary method for dashboard loading from a cloud-based data warehouse cache according to embodiments of the present invention.

For further explanation, FIG. 7 sets forth a flow chart illustrating an exemplary method for dashboard loading from a cloud-based data warehouse cache according to embodiments of the present invention that includes determining (502) (e.g., by a dashboard module (126)) that a result for a first query is stored in a cache (208) of a cloud-based data warehouse (192) by generating (602) (e.g., by the dashboard module (126)) a digest for the first query and identifying (604), based on the digest, an entry in a data structure tracking a state of the cache (208) of the cloud-based data warehouse (192); sending (506) (e.g., by the dashboard module (126)), in response to the result being stored in the cache (208), to the cloud-based data warehouse (192), a request (508) for the result from the cache (208); and providing (510) (e.g., by the dashboard module (126)), based on the result (504) for the first query, one or more dashboard visualizations.

The method of FIG. 7 differs from FIG. 6 in that the method of FIG. 7 also includes determining (702), based on the entry, a location in the cache (208) of the result. For example, the entry may indicate a location in cache (208) for the result. The location may then be included in the request (508). As another example, the entry may indicate a query identifier generated when an instance of the first query was submitted to a database (206) to generate the cached results. The query identifier may then be used to access another data structure associating query identifiers and locations in cache (208). Where the other data structure in implemented in the data access computing system (152), the dashboard module (126) may access the identified location in cache based on the query identifier. Where the other data structure associating query identifiers and locations in cache (208) is implemented by the cloud-based data warehouse (192), the query identifier may be included in the request (508) such that the cloud-based data warehouse (192) may determine the location of the result in cache (208) based on the query identifier.

Figure 8:
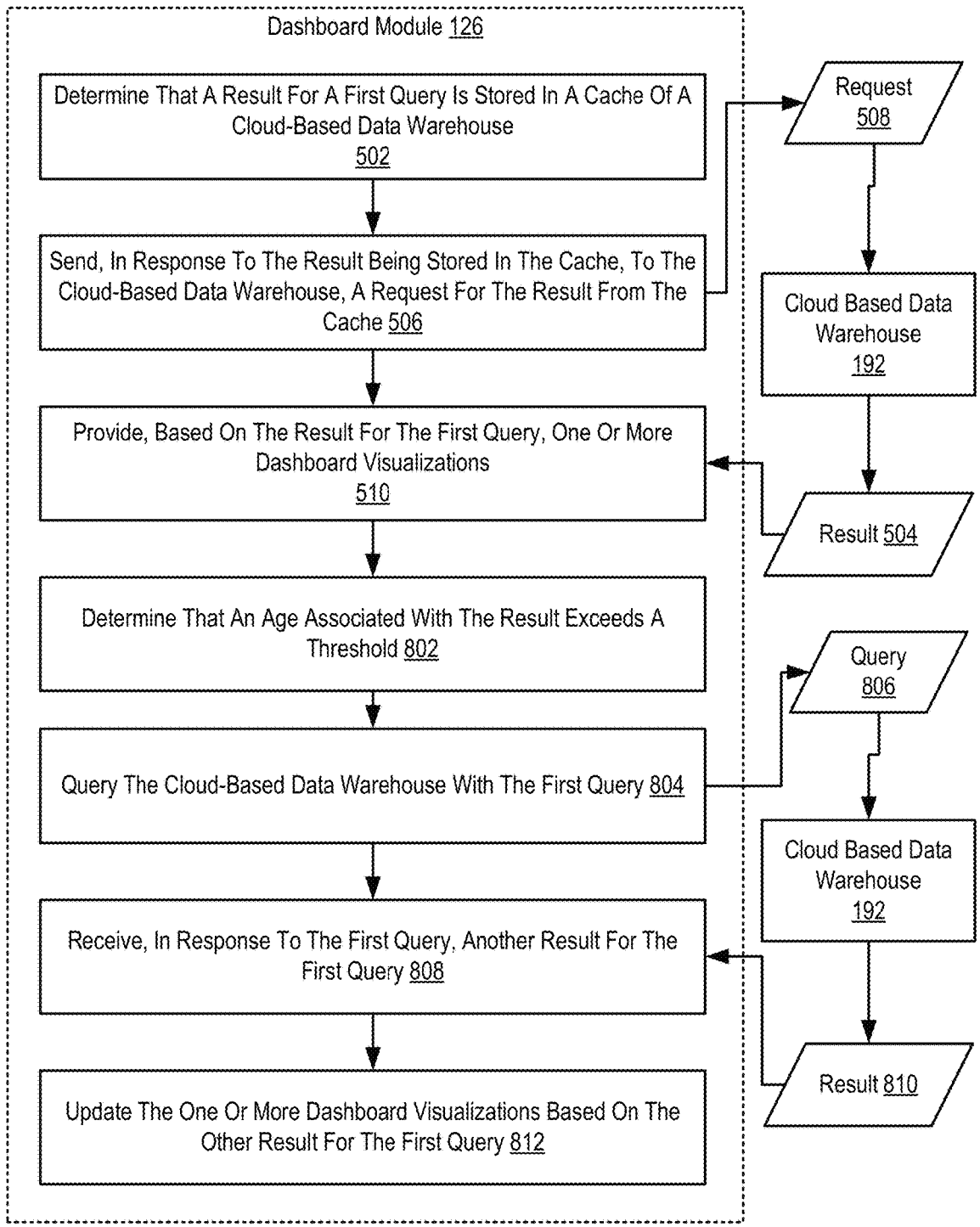
FIG. 8 sets forth a flow chart illustrating an exemplary method for dashboard loading from a cloud-based data warehouse cache according to embodiments of the present invention.

For further explanation, FIG. 8 sets forth a flow chart illustrating an exemplary method for dashboard loading from a cloud-based data warehouse cache according to embodiments of the present invention that includes determining (502) (e.g., by a dashboard module (126)) that a result for a first query is stored in a cache (208) of a cloud-based data warehouse (192); sending (506) (e.g., by the dashboard module (126)), in response to the result being stored in the cache (208), to the cloud-based data warehouse (192), a request (508) for the result from the cache (208); and providing (510) (e.g., by the dashboard module (126)), based on the result (504) for the first query, one or more dashboard visualizations.

The method of FIG. 8 differs from FIG. 5 in that the method of FIG. 8 also includes determining (802) (e.g., by the dashboard module (126)) that an age associated with the result exceeds a threshold (e.g., one hour). The age of a given result is a time since the result was generated or received (e.g., in response to submission of a query to the database (206) of the cloud-based data warehouse (192)). For example, when results from submission of a query are received, the results may include a query identifier. A timestamp for the results may be included with the results or generated in response to receiving the results. A data structure (e.g., a cache structure (204)) entry corresponding to the query may be created or updated to indicate the timestamp. Thus, the age associated with a result may be determined by accessing the data structure entry associated with the query corresponding to the result.

The method of FIG. 8 also includes querying (804) (e.g., by the dashboard module (126)) the cloud-based data warehouse (192) with the first query (806). For example, the first query (806) may be submitted to the database (206) of the cloud-based data warehouse (192) for processing. The method of FIG. 8 also includes receiving (808), in response to the first query (806), another result (810) for the first query (806). The other results (810) correspond to a more recent execution of the first query (806) when compared to the cached results (504). The method of FIG. 8 also includes updating (812) the one or more dashboard visualizations based on the other result (810) for the first query (806). Thus, the one or more dashboard visualizations are initially provided using cached results (504) to allow for a fast loading and presentation of the dashboard. As the age of the cached results (504) exceed the threshold, the dashboard visualizations are subsequently updated with more recent results (810) based on a new execution of the first query (806). After receiving (808) the results (810), the dashboard module (126) may update a data structure (e.g., cache state (204) data structure) entry corresponding to the first query (806) to indicate a time at which the other result (810) was generated or received. The dashboard module (126) may update the data structure entry corresponding to the first query (806) to indicate a query identifier or location in cache (206) indicated in the other result (810) to facilitate subsequent loading of the other result (810) from cache (206).

Figure 9:
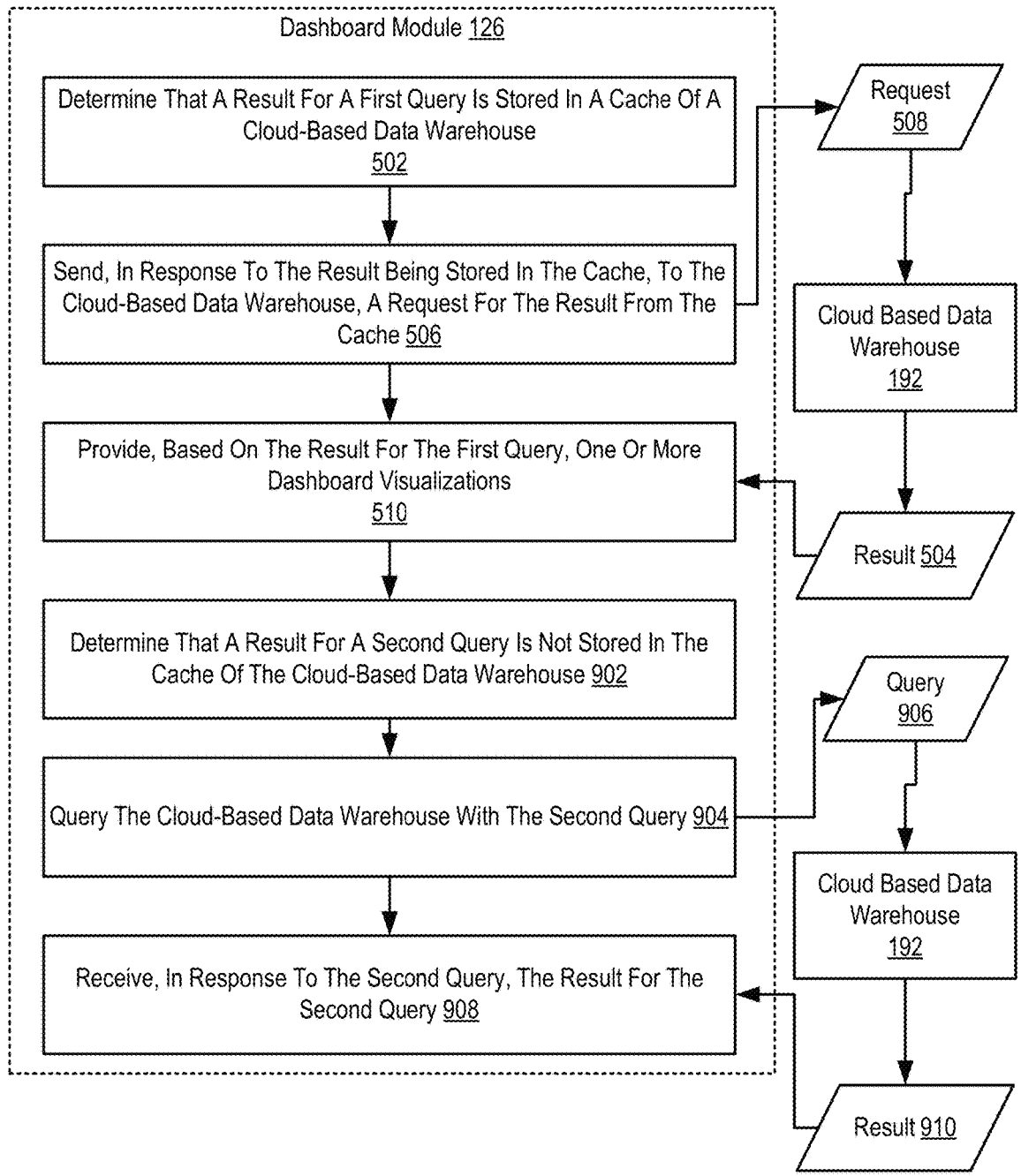
FIG. 9 sets forth a flow chart illustrating an exemplary method for dashboard loading from a cloud-based data warehouse cache according to embodiments of the present invention.

For further explanation, FIG. 9 sets forth a flow chart illustrating an exemplary method for dashboard loading from a cloud-based data warehouse cache according to embodiments of the present invention that includes determining (502) (e.g., by a dashboard module (126)) that a result for a first query is stored in a cache (208) of a cloud-based data warehouse (192); sending (506) (e.g., by the dashboard module (126)), in response to the result being stored in the cache (208), to the cloud-based data warehouse (192), a request (508) for the result from the cache (208); and providing (510) (e.g., by the dashboard module (126)), based on the result (504) for the first query, one or more dashboard visualizations.

The method of FIG. 9 differs from FIG. 5 in that the method of FIG. 9 also includes determining (902) (e.g., by the dashboard module (126)) that a result for a second query (906) is not stored in the cache (208) of the cloud-based data warehouse (192). For example, a digest for the second query (906) may be generated and used to access a data structure (e.g., a cache state (204) data structure) indicating which queries have results stored in cache (208). A lack of an entry in the data structure corresponding to the second query (906) would then indicate that results for the second query (906) are not stored in cache (208).

The method of FIG. 9 also includes querying (904) the cloud-based data warehouse (192) with the second query (906). For example, the dashboard module (126) may submit the second query (906) to a database (206) of the cloud-based data warehouse (192) for processing. The method of FIG. 9 also includes receiving (908), in response to the second query (906), the result (910) for the second query (906).

Figure 10:
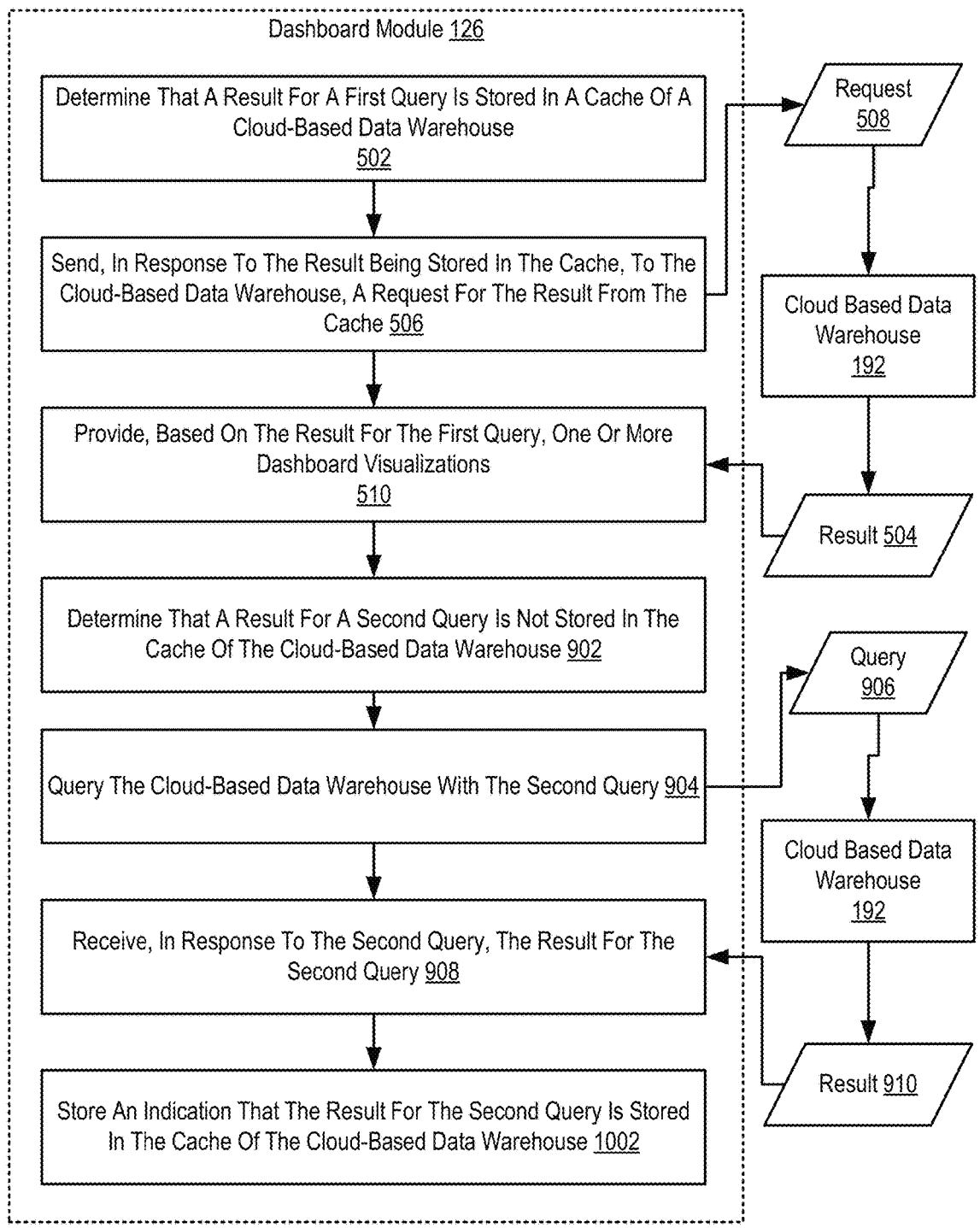
FIG. 10 sets forth a flow chart illustrating an exemplary method for dashboard loading from a cloud-based data warehouse cache according to embodiments of the present invention.

For further explanation, FIG. 10 sets forth a flow chart illustrating an exemplary method for dashboard loading from a cloud-based data warehouse cache according to embodiments of the present invention that includes determining (502) (e.g., by a dashboard module (126)) that a result for a first query is stored in a cache (208) of a cloud-based data warehouse (192); sending (506) (e.g., by the dashboard module (126)), in response to the result being stored in the cache (208), to the cloud-based data warehouse (192), a request (508) for the result from the cache (208); providing (510) (e.g., by the dashboard module (126)), based on the result (504) for the first query, one or more dashboard visualizations; determining (902) (e.g., by the dashboard module (126)) that a result for a second query (906) is not stored in the cache (208) of the cloud-based data warehouse (192); querying (904) the cloud-based data warehouse (192) with the second query (906); and receiving (908), in response to the second query (906), the result (910) for the second query (906).

The method of FIG. 10 differs from FIG. 9 in that the method of FIG. 10 also includes storing (1002) an indication that the result (910) for the second query (906) is stored in the cache of the cloud-based data warehouse (192). For example, a new entry for the second query (906) may be added to a data structure (e.g., a cache state (204) data structure) indicating which queries have results stored in cache (208). The new entry may include a digest for the second query (906). The new entry may include a timestamp associated with the results (910) for the second query (906). The new entry may also include a query identifier (e.g., generated by the cloud-based data warehouse (192) and included with the result (910)).

Figure 11:
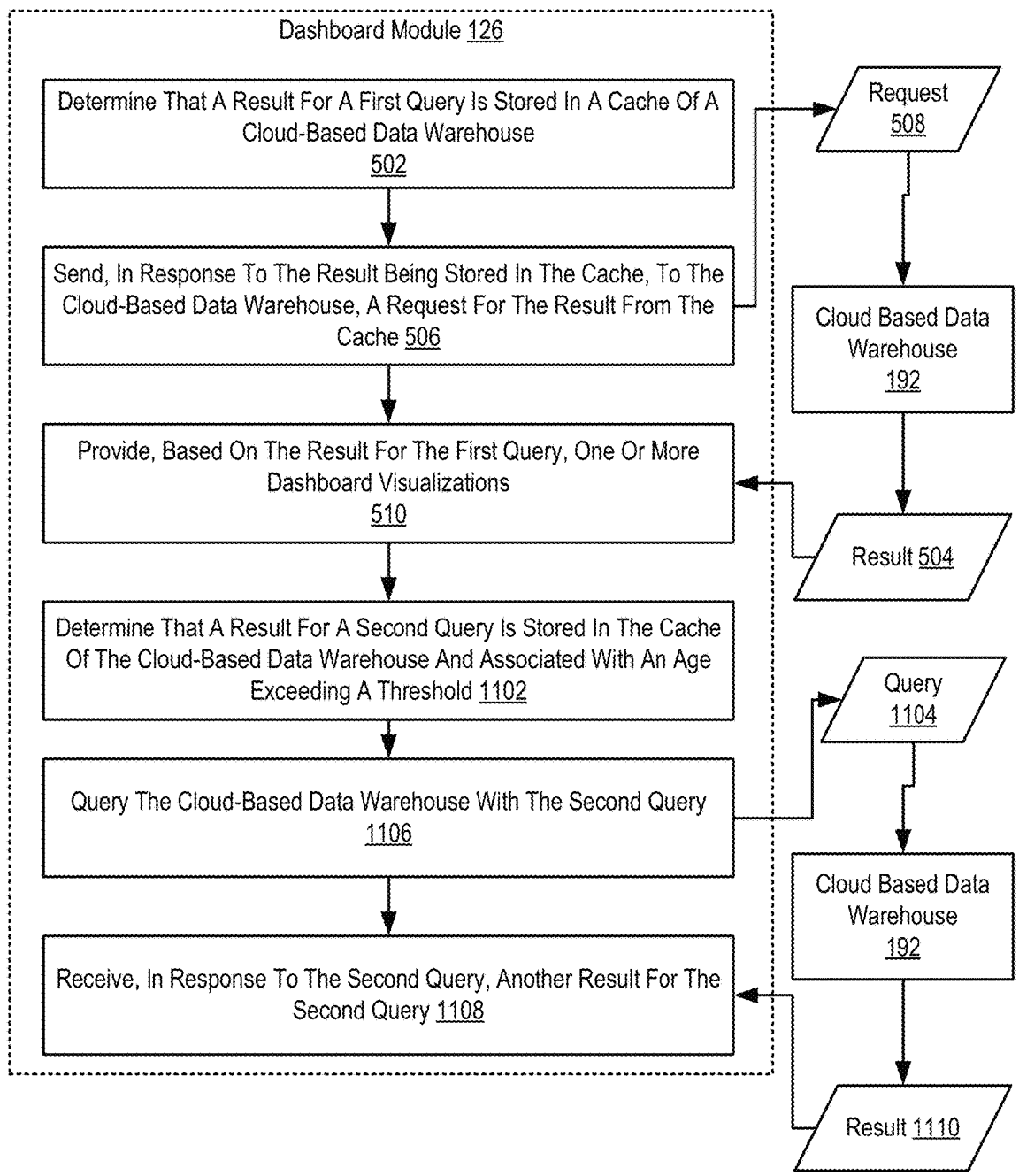
FIG. 11 sets forth a flow chart illustrating an exemplary method for dashboard loading from a cloud-based data warehouse cache according to embodiments of the present invention.

For further explanation, FIG. 11 sets forth a flow chart illustrating an exemplary method for dashboard loading from a cloud-based data warehouse cache according to embodiments of the present invention that includes determining (502) (e.g., by a dashboard module (126)) that a result for a first query is stored in a cache (208) of a cloud-based data warehouse (192); sending (506) (e.g., by the dashboard module (126)), in response to the result being stored in the cache (208), to the cloud-based data warehouse (192), a request (508) for the result from the cache (208); and providing (510) (e.g., by the dashboard module (126)), based on the result (504) for the first query, one or more dashboard visualizations.

The method of FIG. 11 differs from FIG. 5 in that the method of FIG. 11 also includes determining (1102) (e.g., by the dashboard module (126)) that a result for a second query (1104) is stored in the cache (208) of the cloud-based data warehouse (192) and associated with an age exceeding a threshold (e.g., 24 hours). For example, a digest for the second query (1104) may be generated and used to access a data structure (e.g., a cache state (204) data structure) indicating which queries have results stored in cache (208). The entry may include a timestamp used to determine the age of the cached results.

The method of FIG. 11 also includes querying (1106) the cloud-based data warehouse (192) with the second query (1104). For example, the dashboard module (126) may submit the second query (1104) to a database (206) of the cloud-based data warehouse (192) for processing. The method of FIG. 11 also includes receiving (1108), in response to the second query (1104), another result (1108) for the second query (1104). Thus, although cached results for the second query (1104) exist, new results (1110) are generated due to the age of the cached results exceeding a threshold.

In view of the explanations set forth above, readers will recognize that the benefits of dashboard loading from a cloud-based data warehouse cache according to embodiments of the present invention include:

Improving the operation of a computing system by providing for accelerated dashboard loading using cached query results.

Improving the operation of a computing system by reducing the computational burden on cloud-based data warehouses through the use of cached query results.

Exemplary embodiments of the present invention are described largely in the context of a fully functional computer system for dashboard loading from a cloud-based data warehouse cache. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dashboard loading from a cloud-based data warehouse cache, the method comprising:
   determining that a result for a first query is stored in a cache included within a cloud-based data warehouse including identifying, in a local data structure, an entry for the result for the first query, wherein the local data structure tracks a state of the cache within the cloud-based data warehouse;
   sending, to the cloud-based data warehouse, a request to retrieve the result from the cache; and
   providing, based on the result for the first query, one or more dashboard visualizations.

2. The method of claim 1, wherein determining that the result for the first query is stored in the cache of the cloud-based data warehouse comprises:
   generating a digest for the first query, including applying a hash function to the first query to generate, as the digest, a hash value.

3. The method of claim 2, further comprising determining, based on the entry, a location in the cache of the result.

4. The method of claim 1, wherein an age associated with the result for the first query does not exceed a threshold.

5. The method of claim 1, further comprising:
   determining that a result for a second query is not stored in the cache of the cloud-based data warehouse;
   querying the cloud-based data warehouse with the second query; and
   receiving, in response to the second query, the result for the second query.

6. The method of claim 5, further comprising storing an indication that the result for the second query is stored in the cache of the cloud-based data warehouse.

7. The method of claim 1, further comprising:
   determining that a result for a second query is stored in the cache of the cloud-based data warehouse and associated with an age exceeding a threshold;

querying the cloud-based data warehouse with the second query; and receiving, in response to the second query, the result for the second query.

8. An apparatus for dashboard loading from a cloud-based data warehouse cache, the apparatus comprising a computer processor, a computer memory operatively coupled to the computer processor, the computer memory having disposed within it computer program instructions that, when executed by the computer processor, cause the apparatus to carry out the steps of:

determining that a result for a first query is stored in a cache included within a cloud-based data warehouse including identifying, in a local data structure, an entry for the result for the first query, wherein the local data structure tracks a state of the cache within the cloud-based data warehouse;

sending, to the cloud-based data warehouse, a request to retrieve the result from the cache; and providing, based on the result for the first query, one or more dashboard visualizations.

9. The apparatus of claim 8, wherein determining that the result for the first query is stored in the cache of the cloud-based data warehouse comprises:

generating a digest for the first query, including applying a hash function to the first query to generate, as the digest, a hash value.

10. The apparatus of claim 9, wherein the steps further comprise determining, based on the entry, a location in the cache of the result.

11. The apparatus of claim 8, wherein an age associated with the result for the first query does not exceed a threshold.

12. The apparatus of claim 8, wherein the steps further comprise:

determining that a result for a second query is not stored in the cache of the cloud-based data warehouse;

querying the cloud-based data warehouse with the second query; and receiving, in response to the second query, the result for the second query.

13. The apparatus of claim 12, wherein the steps further comprise storing an indication that the result for the second query is stored in the cache of the cloud-based data warehouse.

14. The apparatus of claim 8, wherein the steps further comprise:

determining that a result for a second query is stored in the cache of the cloud-based data warehouse and associated with an age exceeding a threshold;

querying the cloud-based data warehouse with the second query; and receiving, in response to the second query, the result for the second query.

15. A computer program product for dashboard loading from a cloud-based data warehouse cache, the computer program product disposed upon a computer readable medium, the computer program product comprising computer program instructions that, when executed, cause a computer to carry out the steps of:

determining that a result for a first query is stored in a cache included within a cloud-based data warehouse including identifying, in a local data structure, an entry for the result for the first query, wherein the local data structure tracks a state of the cache within the cloud-based data warehouse;

sending, to the cloud-based data warehouse, a request to retrieve the result from the cache; and providing, based on the result for the first query, one or more dashboard visualizations.

16. The computer program product of claim 15, wherein determining that the result for the first query is stored in the cache of the cloud-based data warehouse comprises:

generating a digest for the first query, including applying a hash function to the first query to generate, as the digest, a hash value.

17. The computer program product of claim 16, wherein the steps further comprise determining, based on the entry, a location in the cache of the result.

18. The computer program product of claim 15, wherein an age associated with the result for the first query does not exceed a threshold.

19. The computer program product of claim 15, wherein the steps further comprise:

determining that a result for a second query is not stored in the cache of the cloud-based data warehouse;

querying the cloud-based data warehouse with the second query; and receiving, in response to the second query, the result for the second query.

20. The computer program product of claim 19, wherein the steps further comprise storing an indication that the result for the second query is stored in the cache of the cloud-based data warehouse.

* * * * *